United States Patent
Komoni

(10) Patent No.: US 11,637,705 B2
(45) Date of Patent: Apr. 25, 2023

(54) SYSTEM HAVING TRACKER DATA VALIDATION

(71) Applicant: Tive, Inc., Boston, MA (US)

(72) Inventor: Krenar Komoni, Worcester, MA (US)

(73) Assignee: Tive, Inc., Boston, MA (US)

(*) Notice: Subject to any disclaimer, the term of this patent is extended or adjusted under 35 U.S.C. 154(b) by 221 days.

(21) Appl. No.: 17/062,176

(22) Filed: Oct. 2, 2020

(65) Prior Publication Data

US 2021/0105140 A1   Apr. 8, 2021

Related U.S. Application Data

(60) Provisional application No. 62/910,056, filed on Oct. 3, 2019.

(51) Int. Cl.
*H04L 29/06* (2006.01)
*H04L 9/32* (2006.01)
*G06F 13/42* (2006.01)

(52) U.S. Cl.
CPC ........ *H04L 9/3236* (2013.01); *G06F 13/4282* (2013.01); *G06F 2213/0016* (2013.01); *G06F 2213/0042* (2013.01)

(58) Field of Classification Search
CPC ..... H04L 9/3236; H04L 63/12; H04L 9/3247; G06F 13/4282; G06F 2213/0016; G06F 2213/0042; H04W 4/35; H04W 12/10; H04W 4/029; G06Q 10/0833
See application file for complete search history.

(56) References Cited

U.S. PATENT DOCUMENTS

| | | | |
|---|---|---|---|
| 9,456,302 B2* | 9/2016 | Skomra | H04W 4/021 |
| 2009/0210914 A1* | 8/2009 | Suzuki | H04L 67/104 |
| | | | 725/87 |
| 2016/0344550 A1* | 11/2016 | Anton | H04L 9/3236 |
| 2017/0279774 A1* | 9/2017 | Booz | G06Q 20/0658 |
| 2018/0109516 A1* | 4/2018 | Song | H04L 63/0823 |
| 2019/0141097 A1* | 5/2019 | Shang | H04L 67/10 |
| 2019/0353709 A1* | 11/2019 | Kaisers | G01R 31/392 |
| 2020/0074398 A1* | 3/2020 | Linton | G01S 19/16 |
| 2020/0143318 A1* | 5/2020 | Herman | H04W 4/029 |
| 2020/0259908 A1* | 8/2020 | Klinkner | H04L 67/535 |
| 2020/0294032 A1* | 9/2020 | Cheng | H04L 63/0861 |
| 2021/0058353 A1* | 2/2021 | Creech | H04L 51/212 |
| 2021/0135854 A1* | 5/2021 | Karame | H04L 9/3247 |
| 2022/0179998 A1* | 6/2022 | Lamplmair | H04L 9/50 |

OTHER PUBLICATIONS

Goldin, "Token-Curated Registries 1.0;" Blog Post from *Medium*; Retrieved from https://medium.com/@ilovebagels/token-curated-registries-1-0-61a232f8dac7; Sep. 14, 2017; 13 Pages.
Wikipedia.org, "Merkle Tree;" Definition of Merkle Tree retrieved on Sep. 8, 2020 from https://en.wikipedia.org/wiki/Merkle_tree; 5 Pages.

* cited by examiner

*Primary Examiner* — Taghi T Arani
*Assistant Examiner* — Lin Chang
(74) *Attorney, Agent, or Firm* — Daly Crowley Mofford & Durkee, LLP

(57) ABSTRACT

Methods and apparatus for providing validation of data from the tracker devices. In embodiments, a method includes registering a tracker device with a device registry and issuing by an issuer the tracker device to a third party. Raw and signed data is collected from the tracker device is hashed and stored to enable later validation of the data.

22 Claims, 17 Drawing Sheets

US 11,637,705 B2

SYSTEM HAVING TRACKER DATA VALIDATION

CROSS REFERENCE TO RELATED APPLICATIONS

The present application claims the benefit of U.S. Provisional Patent Application No. 62/910,056, filed on Oct. 3, 2019, which is incorporated herein by reference.

BACKGROUND

As is known in the art, sensors can include various components such as temperature, humidity, accelerometers, gyroscopes, magnetometers, and others. Such sensors can be used to collect data which can be processed.

DETAILED DESCRIPTION

FIGS. 1A-1E illustrate an exemplary multi sensor electronic device 100 that can collect and transmit sensor data that can be processed to validate tracking data in a tracker data validation system. It is understood that a multi-sensor electronic device, e.g., device 100 in FIG. 1, can be referred to as a tracker or tracking device.

Figure 1A:
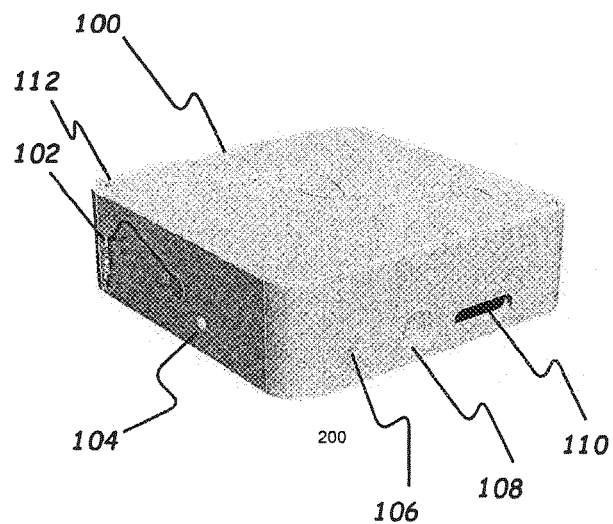
FIG. 1A is a perspective view of an exemplary electronic sensor device that can form part of a tracker data validation system in accordance with one or more embodiments.

FIG. 1A illustrates an exemplary multi sensor electronic device 100 in accordance with one or more embodiments. The device 100 has an outer case with a power button 108, which is used to turn on and off the device 100. The power button 108 can also be used to check the battery life of the device by pressing the button for a short time (e.g., less than a second). In one or more embodiments, a single multi-color (red, green, and blue) LED light 102 is used to indicate the status and the states of the device. The functionalities that the notification LED 102 can show include: battery power, cellular connectivity, GPS/GNSS connectivity, WPAN/WLAN/WWAN connectivity, various malfunctions, an OK (all good) status, and other features of the device. The blinking of the LED 102 and its colors can be programmed to indicate these features and various other notifications. The power button 108 pushing sequence and pushing length can also be programmed such that these various states of the device can be checked, or device actions can be performed.

In embodiments, the type C USB port (or other port such as, e.g., a mini or micro USB port) 110 is a multi-function port that can be used for one or more of the following: (1) for charging the battery, (2) to connect an external battery and extend the operation of the device, (3) to power the device where the LED 106 would light up, (4) to configure the device and update the firmware, and/or (5) to send other data such as sensor data through USB 110. This USB can also be utilized to communicate using other protocols with an adapter for UART/SPI/I2C or others and then sending data using those other protocols. In addition, the USB port can be used to connect two or more devices together so that they can share data between their sensors, processors, and/or their modules and utilize each other's wireless communication capabilities.

In embodiments, there are multiple sensors placed on the device. In some embodiments, sensors are provided for sensing of environmental conditions, ambient light, and/or infrared light. In order to perform these functions, the device utilizes sensors that measure: temperature, humidity, air pressure, acceleration, rotation, motion, and/or light, and they could be internal to the device or external sensors that communicate with the device using wireless communications such as BLE, WiFi, ZigBee, or other proprietary or open standards available. In one embodiment, an opening window 104 is provided enabling air flow and light to enter the device case. The general-purpose hole or lanyard hole 112 can be used for attaching the device to keys, bags, cars, and other things.

Figure 1B:
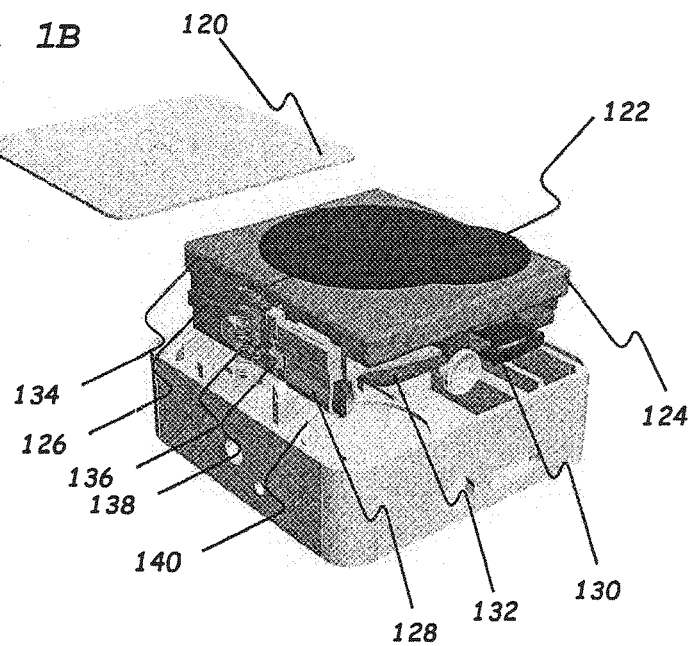
FIG. 1B is an exploded view of the FIG. 1A device.
Figure 1C:
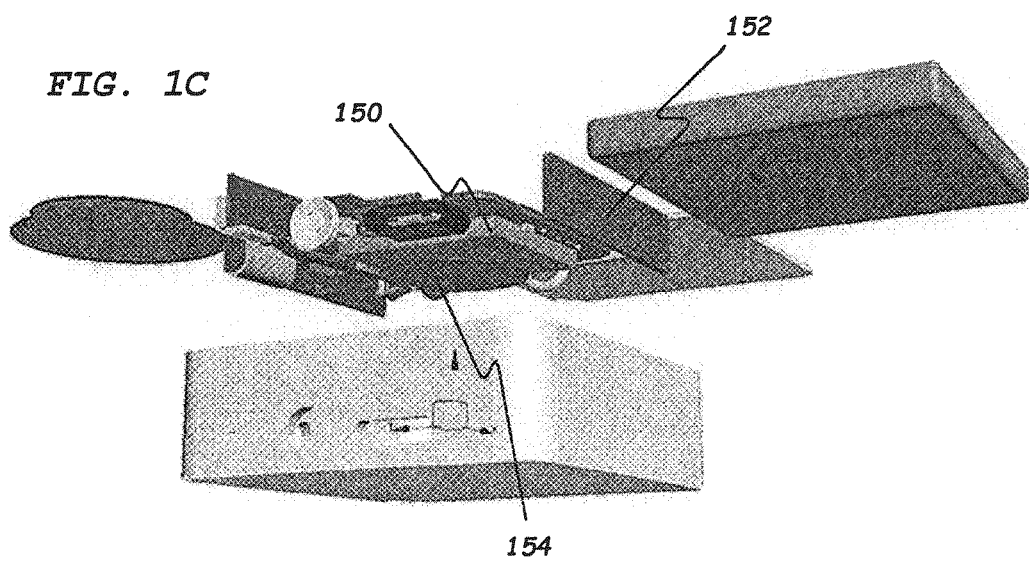
FIG. 1C is a further exploded view of the FIG. 1A device.
Figure 1D:
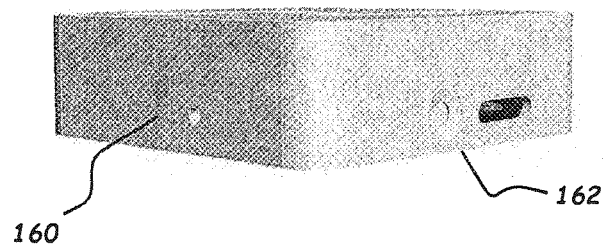
FIG. 1D is a further perspective view of the FIG. 1A device.
Figure 1E:
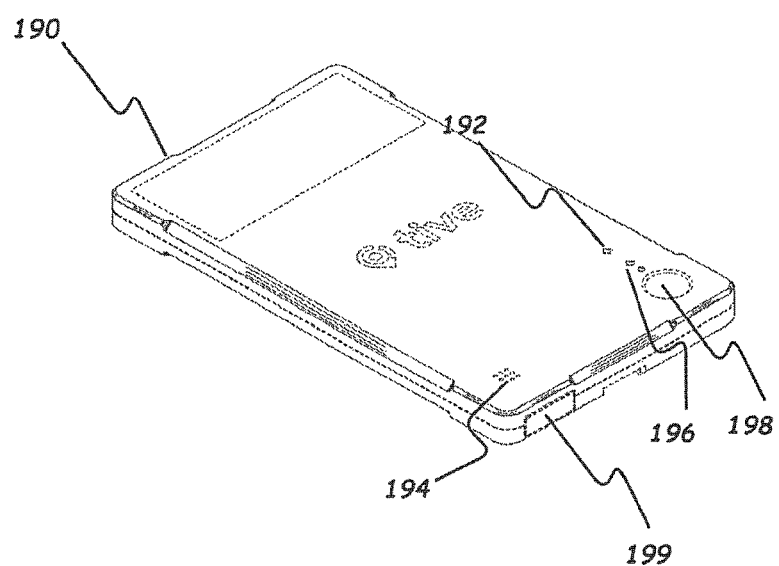
FIG. 1E is a perspective view of another exemplary electronic sensor device in accordance with one or more embodiments.

FIG. 1E illustrates an exemplary multi sensor electronic device 190 in accordance with one or more embodiments. The device 190 has an outer case with a power button 198, which is used to turn on and off the device 190. The power button 198 can also be used to check the battery life of the device by pressing the button for a short time (e.g., less than a second). In one or more embodiments, a single multi-color (red, green, and blue) LED light 196 is used to indicate the status and the states of the device. The functionalities that the notification LED 196 can show include: battery power, cellular connectivity, GPS/GNSS connectivity, WPAN/WWAN connectivity, various malfunctions, an OK (all good) status, and other features of the device. The blinking of the LED 196 and its colors can be programmed to indicate these features and various other notifications. An opening window 192 is used for the light to enter the device case, and that is the location of a light sensor under the light-pipe that can be placed in that opening. The power button 198 pushing sequence and pushing length can also be programmed such that these various states of the device can be checked, or device actions can be performed.

In embodiments, the type C USB port (or other port such as, e.g., a mini or micro USB port) 199 is a multi-function port that can be used for one or more of the following: (1) for charging the battery, (2) to connect an external battery and extend the operation of the device, (3) to power the device where the LED 196 would light up, (4) to configure the device and update the firmware, and/or (5) to send other data such as sensor data through USB 199. This USB can also be utilized to communicate using other protocols with an adapter for UART/SPI/I2C or others and then sending data using those other protocols. In addition, the USB port can be used to connect two or more devices together so that they can share data between their sensors, processors, and/or their modules and utilize each other's wireless communication capabilities.

In embodiments, there are multiple sensors placed on the device. In some embodiments, sensors are provided for sensing of environmental conditions, ambient light, and/or infrared light. In order to perform these functions, the device utilizes sensors that measure: temperature, humidity, air pressure, acceleration, rotation, motion, and/or light, and they could be internal to the device or external sensors that communicate with the device using wireless communications such as BLE, WiFi, ZigBee, or other proprietary or open standards available. In one embodiment, an opening window 194 is provided enabling air flow and light to enter the device case.

FIG. 1B illustrates an exploded view of the electronic device 100 where various internal parts are shown in more detail. The case cover 120 includes a lanyard hole 112. The device includes a GPS/GNSS antenna 122, which can be a flexible omnidirectional antenna. The battery 124 is placed on the device and it could be smaller or larger than the one shown in the figure. The device can include a Bluetooth or WiFi antenna, which can be provided as a chip antenna 126. The type C USB connector 130 for recharging the battery can also be used to program the micro controller. In embodiments, the main PCB 132 and the side PCB 134 of the device are connected using a ribbon type cable 128. The side PCB 134 also contains a light sensor 136 and the temperature/humidity/pressure/volatile organic compound (VOC) sensor 138. The device includes an alarm buzzer placed in the circle shaped space 140. A double-sided tape or other adhesive can be used to attach the buzzer to the case such that it can cause vibrations and sound can be emitted out of the device.

FIG. 1C illustrates another angle of the device showing a 2G/3G/4G cellular antenna as a PCB antenna 152, the buzzer 154, and a cellular module 150. The antennas can be designed for world-wide coverage.

FIG. 1D shows the device from a perspective in which LED 160 and power button 162 are both visible. Power button 162 is used to switch the device on or off, check status, and push data to the cloud. Each of these actions may be accomplished by different inputs using the power button and results in an output from the LED 160, in the form of either red, green or blue light combination. Additional detail of an example sensor is shown and described in U.S. Patent Publication No. 2017/0208426, which is incorporated herein by reference.

Figure 2:
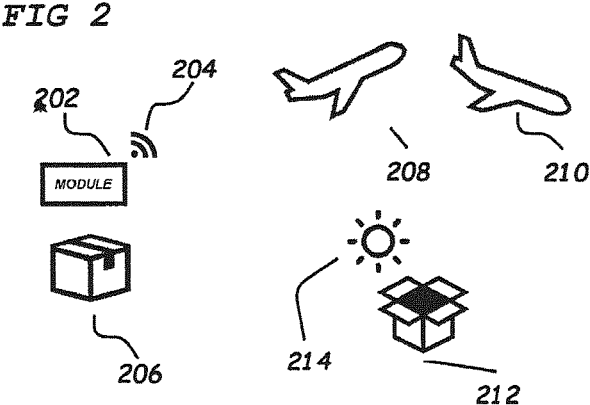
FIG. 2 illustrates an exemplary asset tracking process using a sensing device.

FIG. 2 shows an exemplary asset tracking application using a multi-sensor device 202 in accordance with one or more embodiments. The device is used to track and trace packages 206 during transportation in this example. In one embodiment, the multi-sensor device with wireless connectivity can be utilized to track/monitor the location, temperature, humidity, pressure, presence of VOCs, motion, handling, shock, and see if the package has been opened by interpreting data from an ambient light sensor or a proximity sensor. The update rates for each measurement can be modified remotely and can be programmed to connect to a network a selected number of times per period, where the period is some number of seconds, minutes, hours or days.

Tracking of the package can be visualized from its source to its destination. The pressure sensor and the accelerometer on the device can be used to determine the shipping method: ground or air. If the package is being transported by ground the pressure sensor will sense a certain range of pressure values that correspond with measurements of less than a few thousand feet above sea level and accelerometer readings that can correlate to accelerometer reading produced by an automobile, truck, or other means of ground transportation.

If the package is being transported by air, the pressure sensor will detect altitudes that are above 10,000 feet above sea level, for example, and sense accelerations within in a time period that can only be produced by an aircraft during takeoff 208 or landing 210. In embodiments, a sensor detects rate of change on air pressure inside a pressurized aircraft. If the pressure changes are greater than a selected number of Pascals per second that corresponds to the pressure changes inside a cabin of an aircraft. The other way would be to set a threshold so that when the pressure inside an aircraft is greater than a given number of Pascals (corresponding to a level at which aircrafts are usually normally pressurized to), and then turn off any radio transmission capabilities. In embodiments, a pressure sensor could detect the pressure inside an aircraft, which is usually pressurized between 11 and 12 psi, typically at 11.3 psi, when the aircraft is airborne above 10,000 feet, and then turn off any radio transmission capabilities. This mechanism can also be used to independently turn off all radios on the device to comply with FAA or other flight regulations. Additional embodiments that use accelerometer information for radio control are described below.

Turning off the radio causes the device to stop sending sensor measurement data to the cloud. However, the device continuously monitors the status of the package and stores the readings in its memory. An advantage of the device is that it has a memory that communicates to the microcontroller and it can store sensor data with timestamps during transportation of the package. Once connectivity conditions are met, the WWAN, WLAN, or WPAN radios are turned on to establish connectivity to the cloud and transfer the data based on the available wireless connections to the cloud.

Devices in accordance with various embodiments can be operated in various other configurations. For instance, in one example, the device can be configured to stay in sleep mode until there is a movement of the package detected by analyzing the accelerometer sensor data. Once the movement is detected the package can be tracked and traced continuously for a certain amount of time, or indefinitely until it runs out of battery power depending on the setup by the end user. This feature could allow the device to operate longer and save on its battery power. In another example, the device can be configured to be in sleep mode and only wake up once there is a change detected by the ambient light sensor, such as package being opened 212, or any other scenario where the ambient light sensor can change due to light 214 exposures.

In a further example, the device is configured to continuously track temperature or humidity and it can be setup to send an alert once a particular threshold is reached, enabling the safe and efficient transportation of items that are sensitive to temperature or humidity. In another example, the device is configured to monitor how the package has been handled by using the accelerometer sensor. For example, if a fragile package is thrown, tossed or moved in an undesired fashion during shipment, this data can be stored and reported back to the cloud. This can also apply for the orientation of the shipment as there are shipments that require particular orientation during transportation, such as refrigerators, stoves, server racks, and other appliances or electronics. The device can be attached inside the box used to transport these items and the orientation can be tracked and recorded in real-time.

Figure 3:
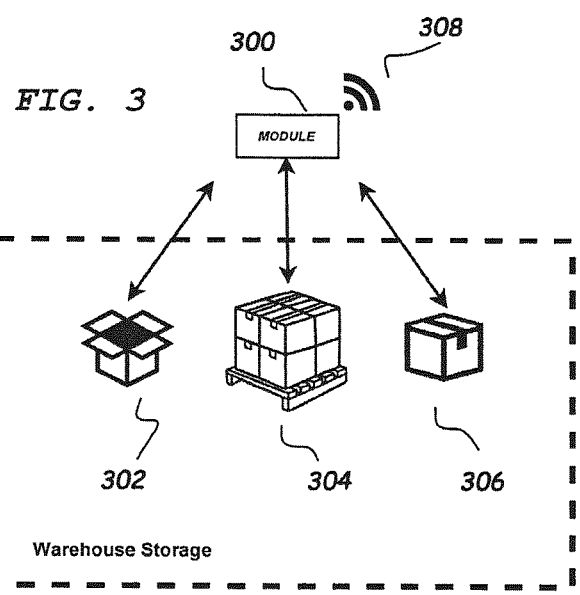
FIG. 3 illustrates an exemplary tracking application using a sensor device.

FIG. 3 illustrates an exemplary motion detection application in accordance with one or more embodiments. In this example, there are various items stored in a warehouse (location) 310 where they are supposed to be stored for multiple days or weeks and not be tampered with. For these types of applications, the device 300 can be placed inside a pallet 304, boxes 306, parcels 302, or other assets in a warehouse (other facilities). The device then can be programmed to stay in sleep mode until there is an actual motion detected by the accelerometer or gyroscope motion detector chipset. This motion can lead to the device waking up and sending a signal to the cloud and informing the end user that there has been tampering on the asset or item at which the device was placed in.

In another illustrative embodiment, the device 300 is placed in one of the assets shown below it: a package 302, a pallet 304, or any other asset 306. The assets are inside a warehouse, but they could be anywhere where tampering of the assets is not permitted for a certain period of time. In this case the device 300 is configured such that the majority of time is kept in sleep mode and once motion is detected it wakes up and utilizes the WPAN, WLAN, or WWAN connectivity 308 to send information to the cloud about the whereabouts of the device, using GPS/GNSS based location, cellular based location, WiFi based location and also send additional information regarding the motion detection due to tampering of the tracked device and the abrupt changes on the accelerometer or gyroscope readings.

Figure 4:
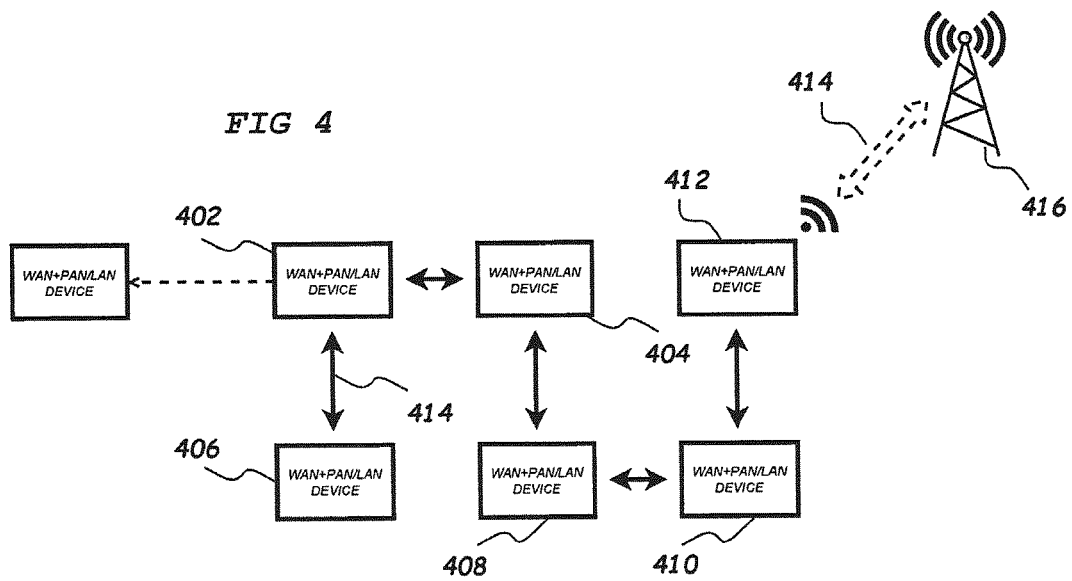
FIG. 4 illustrates an exemplary mesh-network configuration for multiple sensing devices.

FIG. 4 shows an exemplary mesh network application in accordance with one or more embodiments with a combination of personal and Wireless Wide Area Network modules and chipsets. In one or more embodiments, a mesh network between the devices 402, 404, 406, 408, 410, and 412 is created using either USB connection or Wireless Personal Area Network (WPAN) connectivity such as Bluetooth, Bluetooth Low Energy, Bluetooth Smart, ZigBee, Z-Wave, or other low power wireless communication protocols. In this scenario, even though the devices (two or more) have WWAN 414 connectivity such as cellular, LoRa, Sigfox, or others, one of the devices is assigned to be the master (or designated device) to connect through WWAN 414 such as shown in FIG. 4 where only device 412 is connected to the WWAN.

In another embodiment the device containing WWAN+WPAN+WLAN, WWAN+WPAN, or WWAN+WLAN connectivity combinations could be utilized for reducing or minimizing power consumption. In one or more embodiments, six devices 402, 404, 406, 408, 410, 412 are shown. Initially, device 412 is connected to WWAN, and the device 412 will remain connected to the WWAN network for as long as the battery of the device reaches a certain percentage, such as 20%, 30% or any other percentage threshold. All the sensor readings from the other devices will be transferred to the WWAN connected device 412 through WPAN or WLAN through mesh or direct transfer method. Once that battery threshold is reached, the WWAN connectivity is turned off at the device 412 and WWAN of the next device 410 is utilized, and this continues with all other consecutive devices until the batteries of all devices are fully consumed as WWAN connectivity is a power-hungry connectivity method when compared with the other modules inside the electronic device. The data flow in this example goes from device 412 to 410 through WPAN or WLAN connection, and 410 then sends the received data to the cloud through its WWAN connectivity.

Figure 5:
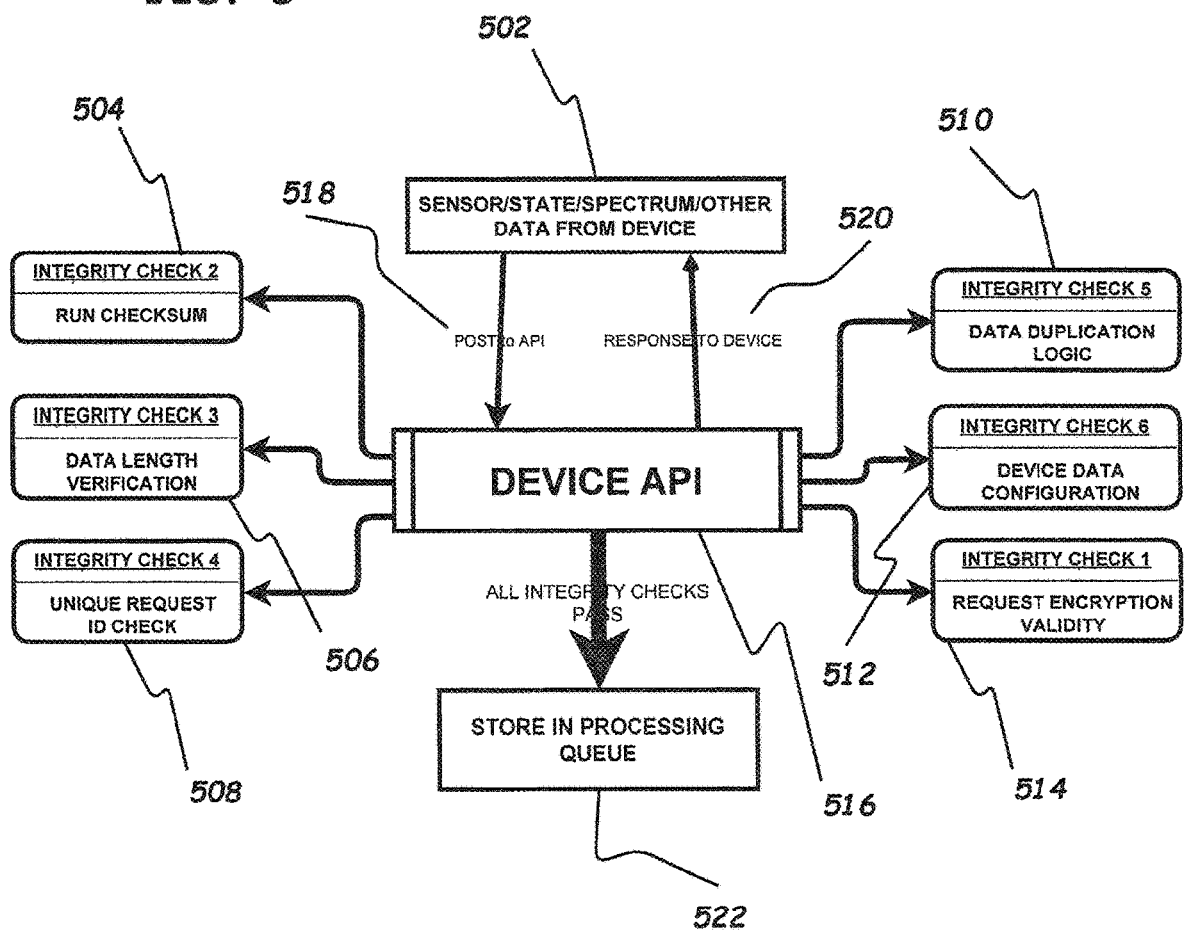
FIG. 5 is a block diagram illustrating an exemplary cloud-based architecture for accepting and sending data to sensing devices.

FIG. 5 illustrates an exemplary device and cloud architecture and how the data flows from the device to the actual database tables on the cloud. In one embodiment, the cloud platform could be custom, or it could utilize one of the well-known cloud platforms such as Google Cloud Platform, Amazon AWS, Microsoft Azure, or other custom backend platform. In another embodiment, the device 502 sends the sensor data, spectrum data, network characteristics data, and any other data available from the device such as Bluetooth network characteristics and any Bluetooth beacons that the device can sense around its area. There are multiple POST/GET methods that can be utilized to send the data to the server.

In another embodiment, the data is sent using the POST method 518 as an HTTP request to the server. As an underlying protocol, TCP, UDP, or other protocols can be utilized for communication to the cloud from the device. Once the Device API 516 receives the data it runs through multiple checks to validate that the data is coming from a real device, it has not been altered, and that the server is not being attacked with malicious hits. In order to read the data, the decryption 514 of the data is performed. The decryption happens using a key that is unique to the device. The keys are securely stored internally on the device and on the server and accessed only when decryption of the data occurs. After decryption, the integrity of the received and decrypted data string is double checked using a checksum 504 such as CRC16, CRC32, or others, if that passes, the length of the data 506 is verified. For each transaction, there is a unique request ID that is generated and checks if the request ID 508 is different from the last transaction. In order to mitigate Denial of Service (DoS) attacks, a duplication check 510 is performed to make sure that the same string is not being sent over and over again by an unauthorized client, where SSL is not utilized. In this case any duplicate data is ignored, this check most likely will not occur as it would have failed the unique request ID check 508. If the above checks pass, a last check 512 of confidence is performed to verify that the incoming data from the device correlates with the configuration of the device. For instance, if the data is being sent every minute and the device is configured to send every 15 minutes, this raises a flag. The device is then checked to make sure that the update rate is set to the client's desired update rate of every 15 minutes. Device API also communicates back to the actual device hardware with response such as SUCCESS of reception of data, and/or ERROR ###, where ### is an error number corresponding to an issue that the device has experienced. Upon successful checks, the device API also responds 520 to the device for "Successful Reception" of data or an error code showing the reason why the data reception failed. If there are any configuration changes on the device, those are also sent at this time. In addition to responding to the device, the device API sends all the verified data to a queue for further processing, computation and storage.

Figure 6:
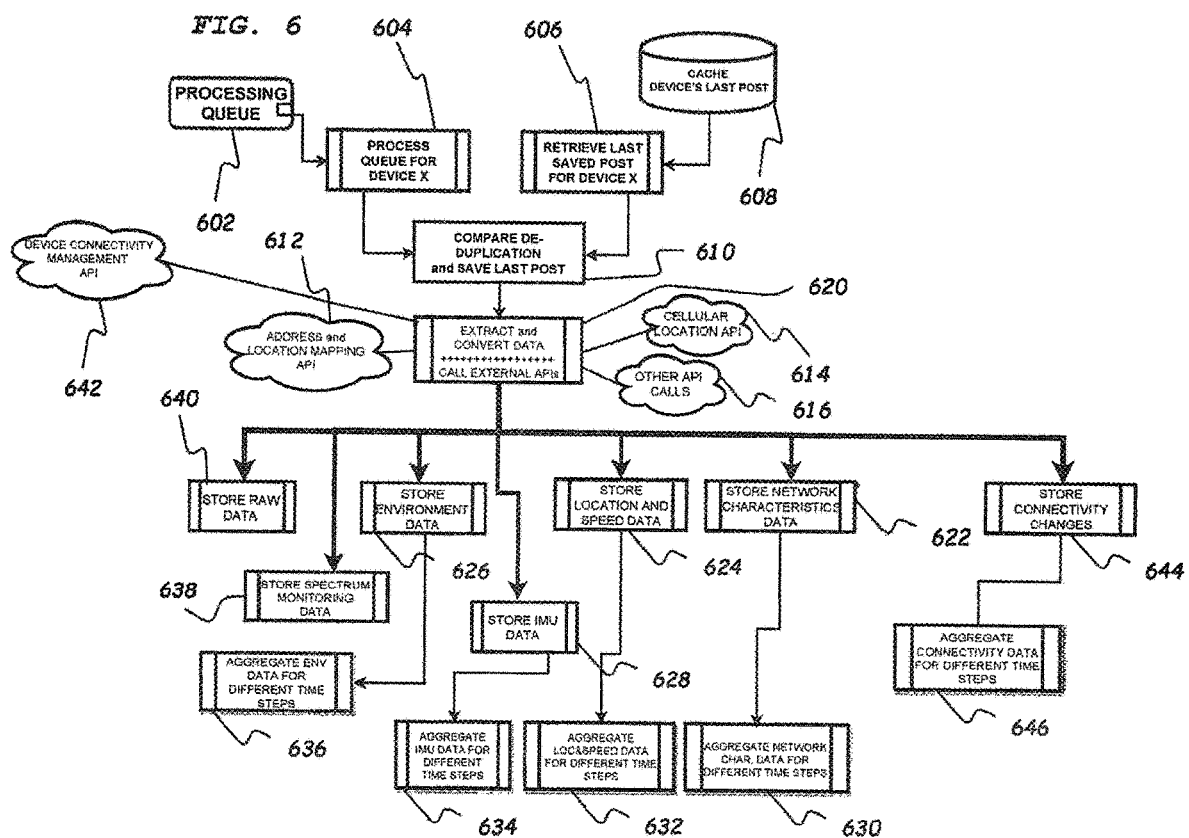
FIG. 6 is a block diagram illustrating an exemplary cloud-based architecture for processing data that is obtained by a sensing device and data from external API calls.

FIG. 6 illustrates an exemplary method in accordance with one or more embodiments of processing the data that has been placed in queue by the device API shown in FIG. 5. After the data has been Queued, a First-In-First-Out (FIFO) approach is implemented and scalability will be executed depending on the latency of the last queued message. As the latency increases, more resources are allocated to process 602 the queued data in parallel. Once the device message is retrieved 604 from the queue, another function also retrieves the last stored message for that particular device from cache 608. In order to minimize cellular data usage, duplicate data from device are ignored and only data that changed from the previous message are sent to cloud. This reduces data charges and creates a de-duplication algorithm from which the device operates in. In order to support this approach to data de-duplication, the API receiving the data requires an additional function 610, which compares the received message with the last cached message. The new data from the comparison then is saved in place of the last cached message. After this step, the data is extracted 620 into multiple fields using a JSON parser or a delimiter parser depending on the data format used during transmission, and each field will be stored in its appropriate data table 640 638 628 626 624 622 644. Prior to storing the data on tables, external APIs are called to extracted further data, such as street address and mapping points 612 from longitude and latitude data received from the device's GPS/GNSS. Another external API that is the cellular based location API (such as Combain, UnwiredLabs, OpenCellID, and/or others) 614 is called to obtain an approximate location based on the Local Area Code (LAC), Mobile Network Code (MNC), Mobile Country Code (MCC), and CellID information obtained from base-stations near the device, providing additional information on the location of the device if there is no GPS availability. Another external API that is the cellular based location API (such as Combain, Unwired Labs, Google, and/or others) 616 is called to obtain an approximate location based on WiFi SSID and RSSI values available in the proximity of the device. In addition to data related APIs, other APIs 616 such as WiOFi location or others could also be called to further enrich the raw data received from the device. Another example of additional APIs would be temperature, humidity, and pressure related API. Based on raw location data, outside temperature, pressure, and humidity can be obtained using an external API (such as Accuweather, Weather.Com, and/or others) and that data can be stored for future or immediate correlative comparison to determine whether the device is outdoors or indoors. In addition, device connectivity management APIs 642 are also utilized to observe connectivity session times, data usage, network carrier information, and others. These data points are then combined and stored into multiple tables. Raw data from the device is stored in a raw data table 640. Spectrum monitoring data is stored in a separate table 638, and all the environmental data are stored in table 626. An additional aggregation function is also performed on the environmental data in order to improve the performance and reduce latency at the end user application. This aggregated data is then stored in multiple tables 636 for various time steps. The same also occurs for the Inertial Measurement Unit (IMU) data 628 634, location and speed data 624 632, network characteristics data 622 630, connectivity related data 644 646, motion detection data and other data that goes into processing queue.

Figure 7:
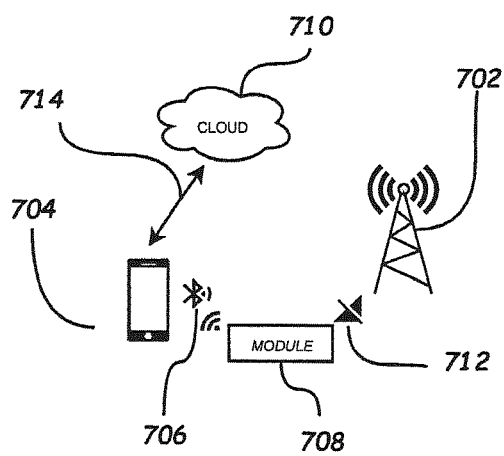
FIG. 7 illustrates an exemplary connection of a sensing device to the cloud through a combination of WPAN, WLAN, and/or WWAN enabled wireless communication.

FIG. 7 shows the device connecting to cloud through another WPAN and WLAN/WWAN enabled device in accordance with one or more embodiments. In the illustrated example, the device is connected through WPAN 706 (Bluetooth Smart or BLE in this case, and others are possible) to a smartphone 704. The device transfers all the sensor readings and other data that it needs to send 714 to the cloud 710 to an app inside the smartphone 704 that connects to the device 708 directly through WPAN. This can occur when the device 708 is synchronized with a smartphone 704 through an app that recognizes the device 708 and it accepts data from the device and then sends it to the cloud 710 so that it can be consumed and utilized by a web application, smartphone app, desktop-based software, or other tool. In this case the device could lose the WWAN/WLAN based connectivity, as shown in 712, and connect to the smartphone 704 through its WPAN enabled connectivity to conserve energy and use a lower power solution such as Bluetooth 706 connection instead of the device's cellular connection 712 to indirectly connect to WWAN or a cell tower 702 as shown in one embodiment.

Figure 8:
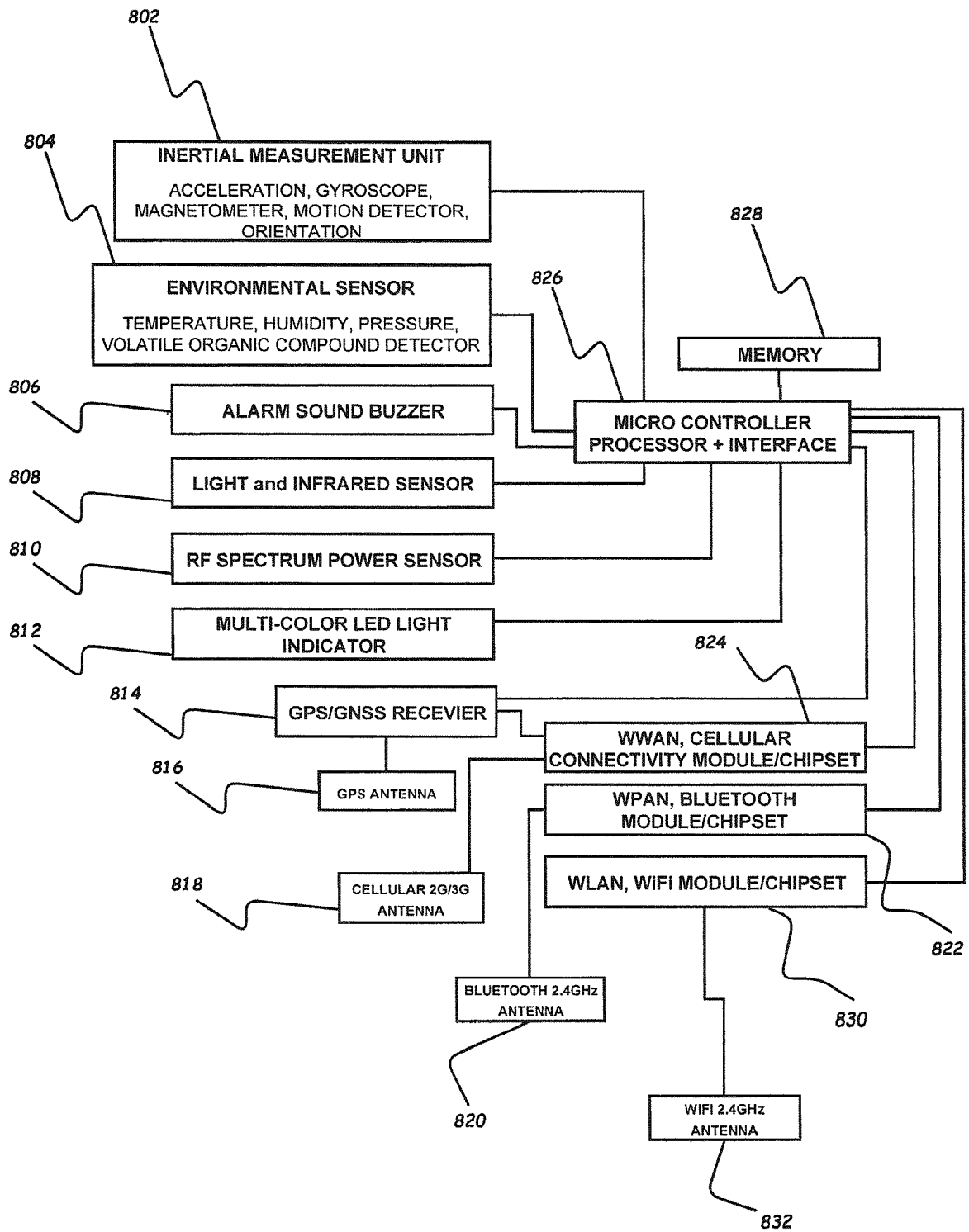
FIG. 8 is a block diagram illustrating components of an exemplary sensing device.

FIG. 8 is a block diagram illustrating components of a multi-sensor electronic device in accordance with one or more embodiments. The device includes a microcontroller (MCU) 826, such as STM32 which is an ARM based microcontroller, or any other microcontroller or microprocessor. The memory 828 is also connected to the MCU and the sensor data can be saved on the memory when the wireless connectivity is not available to send the data to the Internet. The device includes multiple sensors including, but not limited to: (1) inertial measurement unit (IMU) 802, which has an accelerometer, gyroscope, magnetometer, motion detector, and orientation output for the device, (2) environmental sensors, which are comprised of a temperature sensor, humidity sensor, pressure sensor, and volatile compound detector 804, (3) visible light and infrared sensor 808, (4) radio frequency (RF) spectrum power sensor 810 for various frequencies in the cellular bands. The device further includes GPS/GNSS receiver 814 to provide longitude, latitude, speed, and other information that is available from GPS/GNSS receivers. The device also includes alarm sound buzzer 806 used for finding the device or for any alerts or system information. The device also includes a multi-color LED indicator. The device further includes a WWAN cellular connectivity module 824 that can work in various standards (2G/3G/4G), various bands, and various modes of operation. The device also includes a WPAN Bluetooth module 822 that is used to communicate with other devices such as smartphones or other multi-sensor electronic device to form a mesh network. The device also includes a WLAN WiFi module 830 that is used to sense WiFi routers/access points, and possibly communicate through those routers if necessary. The device also includes antennas for GPS 816, cellular connectivity 818, WiFi 832, and Bluetooth 820. The cellular antenna could be changed to meet global cellular coverage requirements for 2G, 3G, 4G and 5G connectivity in the future.

The GPS/GNSS receiver 814 can be a separate receiver or incorporated inside the WWAN cellular connectivity module 824. The WPAN module 822 could also be a ZigBee, Z-Wave, 6LoWPAN, or any other personal area network module. The WWAN module could meet one or more or any combination of cellular standards such as: GSM, UMTS, CDMA, WCDMA, LTE, LTE-A, LTE-Cat1, LTE-Cat0, LTE Cat-M1, NB-IoT, LTE-MTC, LoRa, Sigfox, and others. WWAN module 824 could also be a LoRA or a Sigfox module that connects to the non-cellular network focused of machine-to-machine (M2M) communications. WWAN module 824 can be any other module that functions in wide area using wireless means of communication.

In one aspect, a tracker system provides tracking data validation. In embodiments, the tracker system includes blockchain functionality to validate tracker data, such as tracker data of a customer, against an immutable ledger. With this arrangement, parties using a tracker data system, as shippers, receivers, and tracking device issuers, have assurances that tracker data is accurate and tamper-proof. In embodiments, tracker data systems have enhanced automation and decentralization as compared to existing systems. An illustrative tracker data system can include functionality to register tracking devices from a device issuer, resolve tracker data to a blockchain, and/or validate tracker data.

Figure 9:
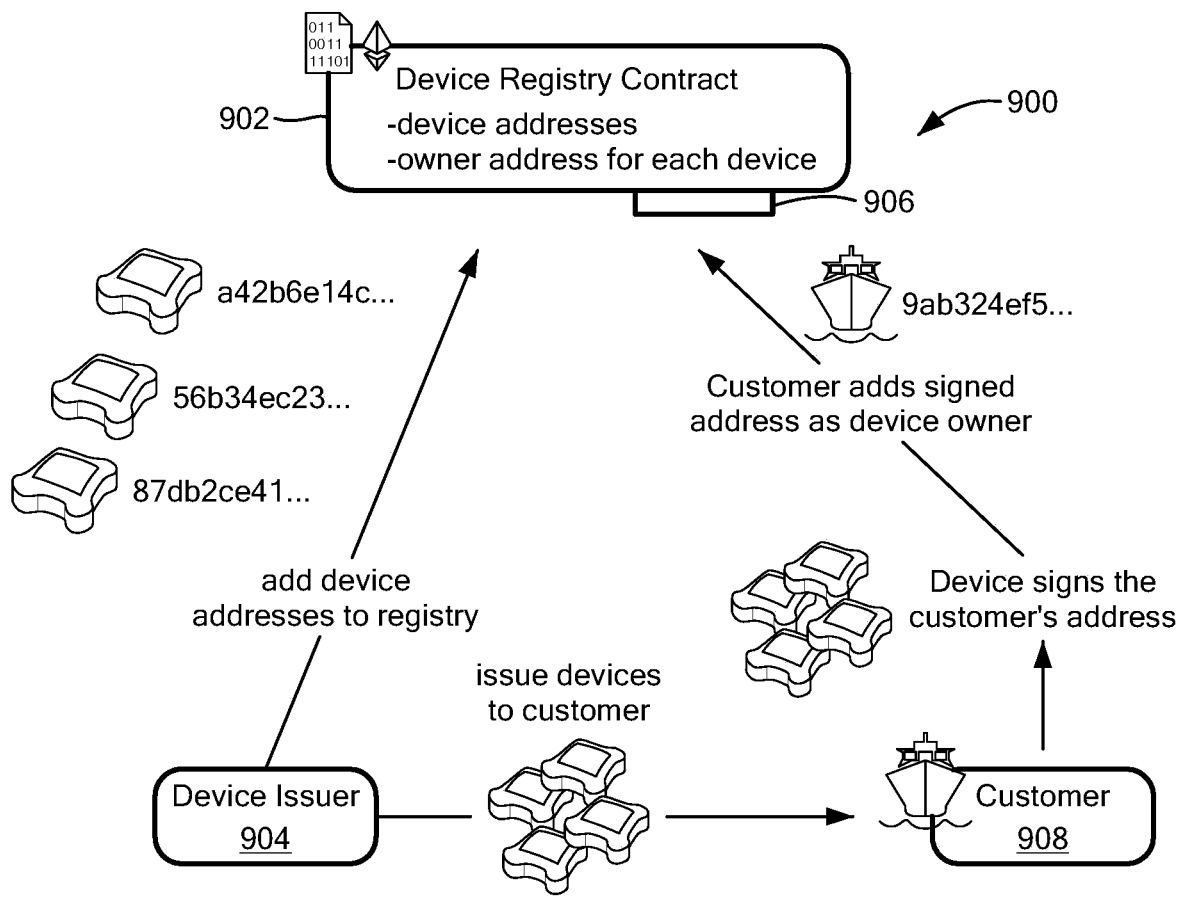
FIG. 9 is a representation of a tracker data validation system in accordance with example embodiments of the invention.

FIG. 9 shows an example tracker data system 900 having a tracking device registry 902 coupled to a device issuing entity 904 and an interface 906, which can provide communications, such as to a customer 908 of the device issuing entity 904. It is understood that the interface 906 can communicate with any suitable computer.

Initially, in example embodiments, the tracker issuing entity 904 registers tracking devices with the tracking device registry 902, which can be provided as a smart contract registry. In embodiments, the tracker issuing entity 904 manages and/or controls the device registry 902. In other embodiments, a third party manages and/or controls the device registry. On a demand basis for example, the tracker issuing entity 904 issues tracking devices to a third party 908, such as a customer that purchases registered tracking devices from the tracker issuing entity. The third party receives the tracking devices and electronically signs the customer address. The customer 908 adds the signed address as device owner to the device registry 902. In embodiments, when a customer 908 receives a tracker device from the issuer 904 the customer can register ownership of that device to a smart contract by having the device sign an address owned by the client and resolving that address and signature to an ownership registry contract.

In embodiments, as tracking devices are distributed, the device issuer 904 can add the devices to the device registry contract 902. Once a client 908 is in physical possession of the device, they can have the device sign their address with its private key and then submit their address and signature to the device registry 902 to claim ownership of the device. In embodiments, the registration process can include creating a registration user interface where the client plugs in the tracker device and enters their address in a field as part of the registration process.

Figure 10:
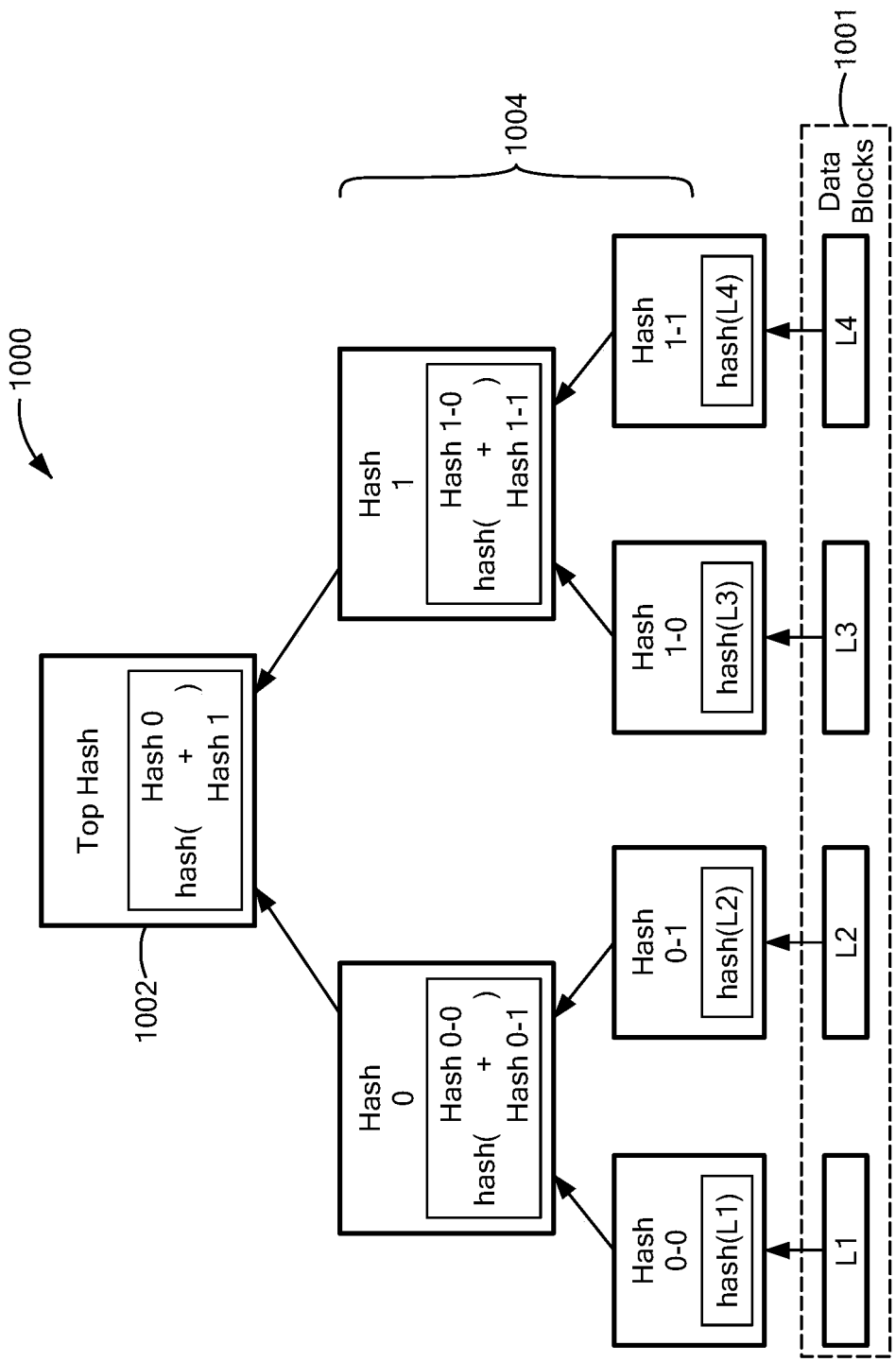
FIG. 10 is a representation of an example Merkle Root that can form a part of the system of FIG. 9.

In embodiments, the tracker data system 900 includes a Merkle-based blockchain architecture. FIG. 10 shows an example Merkle tree implementation which is a particular cryptographic design pattern. Merkle trees allow efficient and secure verification of the contents of large data structures. A Merkle-based tracker data system is well suited to the verification of tracker data on a blockchain because only a small amount of data needs to be stored on-chain and it is straightforward to prove that a single data point is part of a larger group of data points without revealing any information about the larger group.

In the illustrated embodiment, a Merkle tree 1000 includes the entire tree for a group of data points 1001, such as tracking device data. A Merkle Root 1002, which sits at the top of the Merkle tree 1000, is provided as a single hash derived from a group of data points. A Merkle Proof 1004 comprises a set of hashes used to prove that a data point belongs to a specific Merkle Root 1002.

A Merkle Tree Module can create a Merkle tree from a group of data points, generating a Merkle proof for a specific data point in a Merkle tree, and validating Merkle proofs. A Merkle Root Store can permanently store Merkle roots in their respective Merkle root stores in the Merkle Root Store smart contract. In embodiments, the device issuer and the customer store Merkle Roots. Merkle trees along with their roots can be stored in a database hosted by the device issuer and/or the client or stored using a decentralized storage solution such as IPFS.

Figure 11:
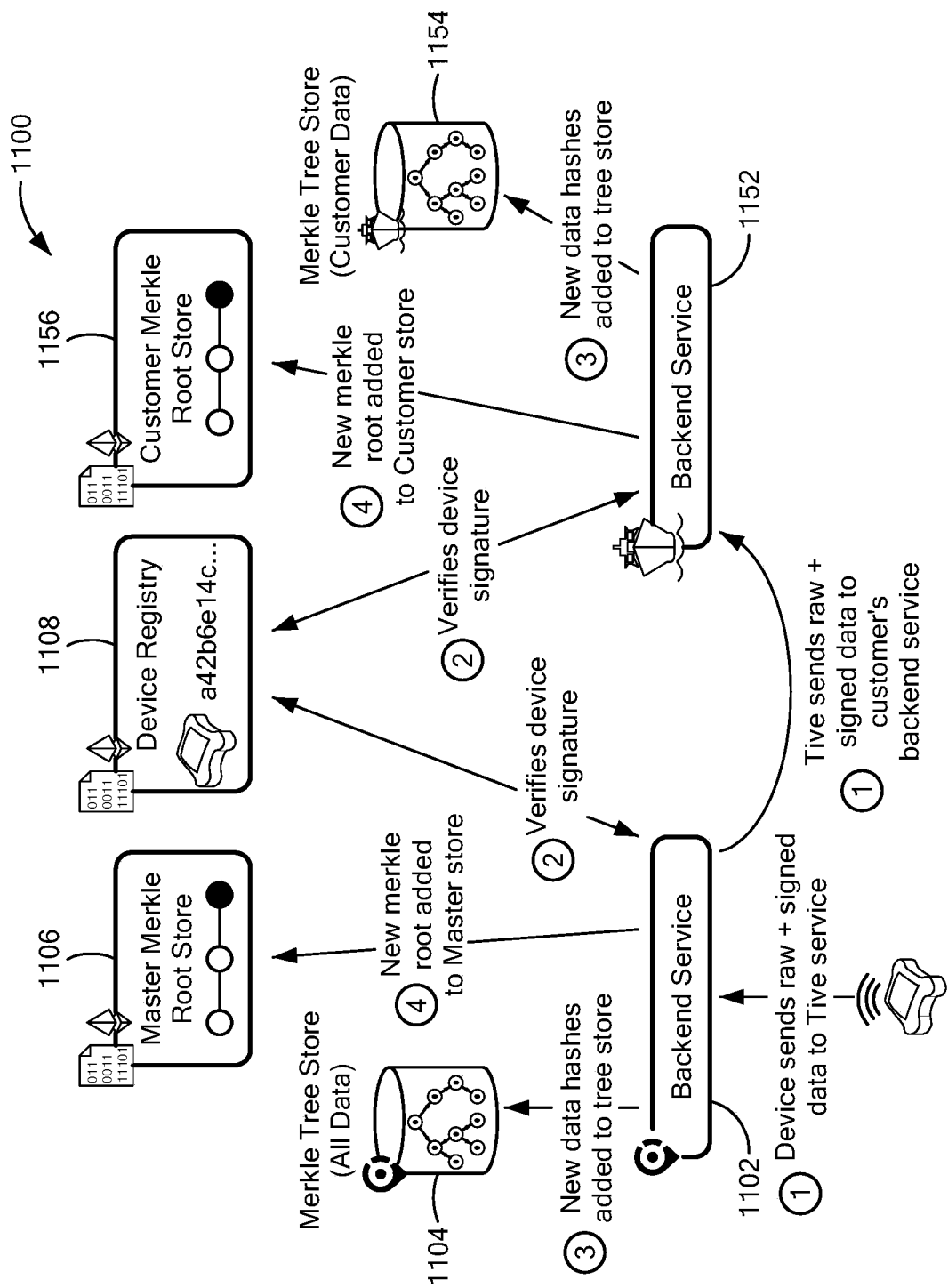
FIG. 11 is a representation of interactions between components in a tracker data validation system.

FIG. 11 shows an example system and data flow 1100 for a tracking device data validation. In embodiments, a tracking device issuer provides a backend service 1102 in communication with a Merkle Tree storage module 1104 and a Master Merkle Root storage module 1106. The backend service 1102 includes an interface to communicate with devices which send raw and/or signed data to the backend service. The backend service 1102 is also coupled to a device registry 1108.

A third party, e.g., a customer, backend service 1152 is in communication with a customer Merkle Tree storage module 1154 and a customer Master Merkle Root storage module 1156. The customer backend service 1152 includes an interface to communicate with the issuer backend service 1102. The customer backend service 1152 is also coupled to the device registry 1108.

Initially, a tracking device send raw and/or signed data to the issuer backend service 1102, which communicates with the device registry 1108 to provide a verified device signature to the backend service. The backend service 1102 then sends new data hashes to the issuer Merkle Tree storage module 1104 and a new Merkle Root to the Master Merkle Root storage module 1106.

After the device issuer completes device registration, the issuer backend service 1102 sends raw and/or signed data to the customer backend service 1152 which communicates with the device registry 1108 to obtain a verified signature for the device. The customer backend service 1152 then sends new data hashes to the customer Merkel Tree storage module 1154 and new Merkle Roots to the customer Merkle Root storage module 1156.

In embodiments, the issuer Merkle Tree storage module 1104 contains data for many tracker devices and the customer Merkle Tree storage module 1154 contains data for the customer's devices. Similarly, the master Merkle Root storage module 1106 contains data for many trackers and the customer Merkle Root storage module 1156 contains data for the customer's tracking devices.

In embodiments, any direct receiver of tracking device data, e.g., the issuer and the customer, can resolve that data to the blockchain so as to create an immutable audit trail. It will be appreciated that this arrangement can be used to prove that that data existed and has not been tampered with or otherwise compromised.

In embodiments, each resolver of data collects data points at a particular cadence (e.g. once an hour, at project completion, etc.) to create a Merkle tree of unresolved data points, save the Merkle tree and data to a database, and add the Merkle root to their respective Merkle store. Once a Merkle root has been added to the Merkle store, it cannot be removed or changed and will exist for the rest of that blockchain's lifetime. In embodiments, the Merkle root contains all data points, together with their time stamps at which those data points were generated from a sensing device.

In the case of a dispute, tracker data points can be validated by any party that has resolved that data point to their Merkle store. By showing that a Merkle root exists in their Merkle store and providing a proof that is derived from the Merkle tree in storage, a party can prove that a data point has not been tampered with. Additionally, the data point signature can be checked against the device registry to prove that it was signed by an authentic device and owned by the appropriate owner at the time the data point was signed. Each device during manufacturing will have a unique private key which will be used to sign the messages using a microprocessor or a crypto processor that runs a SHA-256 or other encryption algorithm, such as the ATECC508A chipset from Microchip. The encrypted raw data sent from the tracker will be verified by the receiving system to confirm that tracker ##### is the actual tracker with that signature.

Figure 12:
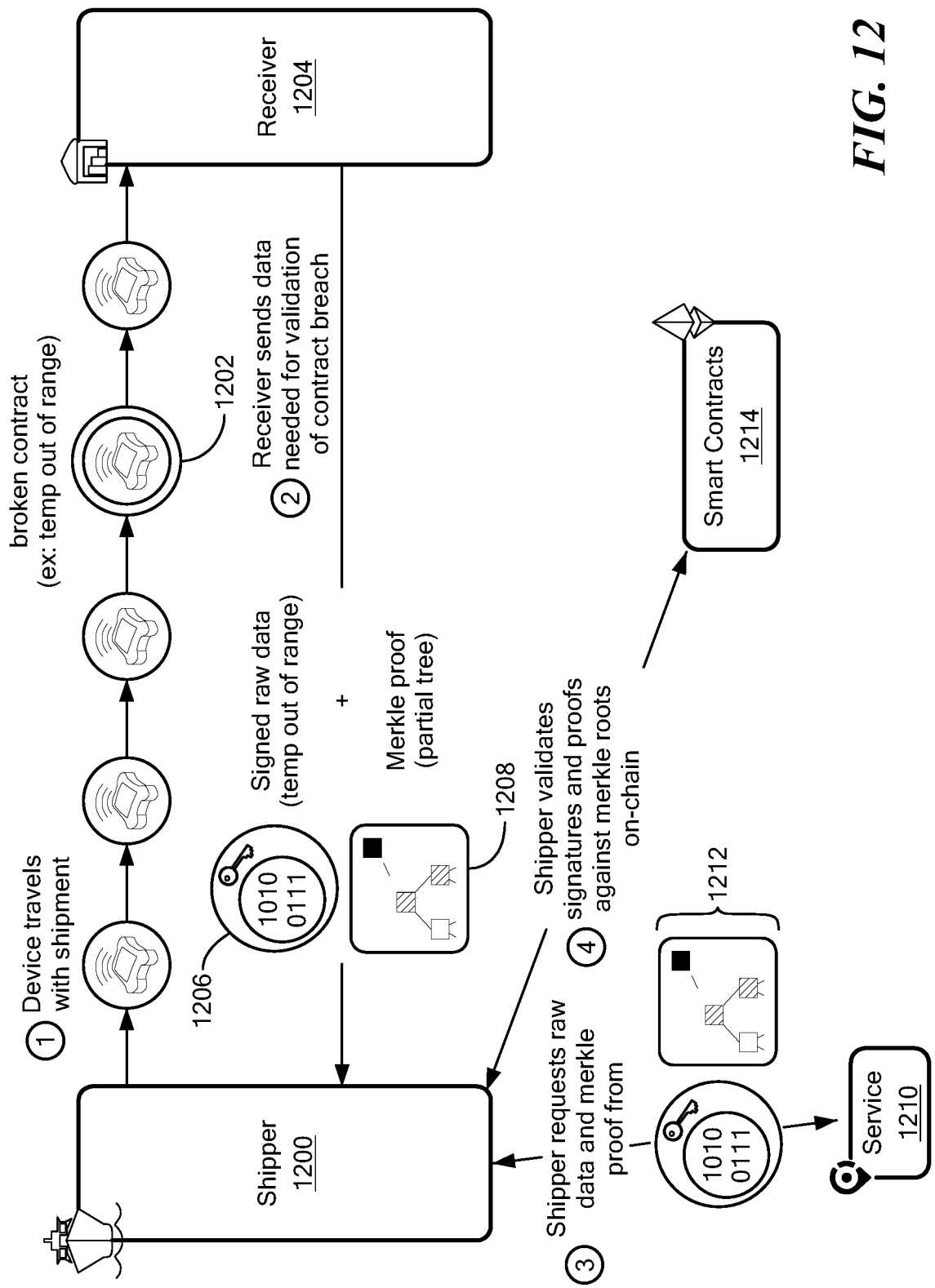
FIG. 12 is a representation of interactions in an example shipper and receiver implementation of tracker data validation.

FIG. 12 shows an example implementation of tracker device data validation. A shipper 1200 ships a package with a tracker device owned by a customer and purchased from a device issuer. The device travels with the shipment and measures sensor data at selected intervals. In at least one measurement 1202, the tracking device measures a parameter that is out of range, such as a temperature above a threshold value. At some point, a receiver 1204 receives the shipment. The receiver 1204 sends data needed for validation of a contract breach, which is the over temperature condition. In embodiments, the data includes signed raw data 1206 and Merkle proof 1208, which includes a partial Merkel Tree. The shipper 1200 receives the data from the receiver 1204 and communicates with the issuer backend service 1210, which can be provided by the device issuer (see FIG. 11), to receive the requested raw data and Merkle proof data 1212. The shipper 1200 can communicate with the device registry (see, e.g., 1108 in FIG. 11) having the smart contract module 1214 for the shipment to receive the device signature for validation and proofs against the Merkle Roots of the relevant chain. With this arrangement, the shipper 1200 sees proof of the over temperature condition, which is a breach of the contract with the sender of the shipment.

In embodiments, a tracker data validation system can include Merkle tree optimizations. While validation of single data points is fairly straightforward, validation of a large stream of data points can become computationally complex without appropriate optimizations. Ensuring data points that will need to be validated at the same time are close together in the Merkle trees will create significantly smaller proofs for groups of data.

In an example embodiment, data points are classified using the following groups and sub groups:
client>project>tracker,
where each client has multiple projects and each project has multiple trackers.

A Merkle Tree Module can be optimized to sort data points resolved in the same tree first by client, then project, and then tracker. Additionally, resolvers can only resolve Merkle trees on a project basis at the completion of the project instead of using an on-going time period such as resolving every hour. By resolving entire projects in a single tree, the entire project's set of data points can be verified by recreating the tree and checking the Merkle root.

In another aspect, a tracker data verification system is decentralized by providing a network that is opened up to multiple device issuers. The network can be governed by a consortium of device issuers and/or token holders instead of a central entity. In some embodiments, the system includes the capability to settle shipments and resolve disputes in a trusted and decentralized manner.

Figure 13:
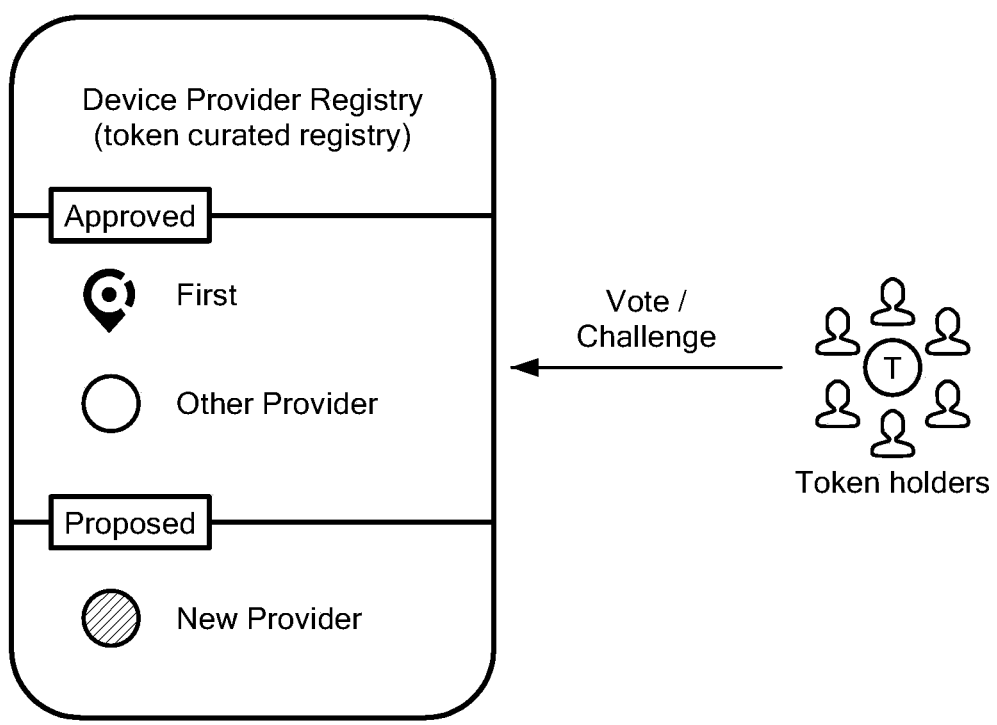
FIG. 13 is a schematic representation of an example device provider registry that can form a part of a tracker data validation system.

FIG. 13 shows an example device registry 1300 having a number of approved device issuers/providers 1302. In embodiments, the registry 1300 includes a mechanism to add new device providers 1304. Token holders 1306 can vote/challenge the providers. In one embodiment the token holders are the representative parties that have agreed to host the registry and verify its validity by having equal voting rights. Tokens determine each parties voting power, and they can be distributed evenly upon hosting parties.

In a decentralized system, the registry of approved device providers can be governed using a Token Curated Registry (TCR) pattern. Device providers should meet a set of standards set by the network. Nonconforming providers can be removed from the registry. Approved device providers can add devices to the device registry.

In another aspect, data can be processed by trusted nodes that process data as a service. The trusted nodes can listen for device data, organize data into Merkle trees, store the Merkle trees in a decentralized storage solution, and resolve each Merkle root to a Merkle Root Store.

The front-end service can be provided by any provider, as long as the data being pulled is out of the registry and Merkle Roots are verifiable. The validity of the system and data comes from the back-end. It may be possible to leverage an existing decentralized storage network such as IPFS.

In a further aspect, shipment settlements are automated using an escrow smart contract and a decentralized dispute handling mechanism. Payment conditions are setup before the shipment begins. When a shipment is completed a payment will be made according to the smart contract.

In embodiments, an escrow smart contract is funded by the receiver before the shipment begins. Once the shipment has been completed, the shipper can report the payment amount according to the payment conditions. After a dispute period has passed, the payment can be withdrawn by the shipper.

In other embodiments, a reputation or credit system is used in place of an escrow contract. Entities fund accounts from which their shipment payments are withdrawn. Each withdrawal is recorded as successful or not successful to the account holder's reputation. Shippers can choose not to deal with or charge premiums to those with poor reputations.

In one embodiment, at any point during the dispute period the receiver can dispute the payment with a different payment amount than the shipper. The receiver places a dispute deposit when the dispute is opened. The shipper must accept the receiver's payment amount or put down an equal deposit. Once both parties have deposited the dispute deposit, a dispute oracle is called upon.

In an example embodiment, disputes are resolved by a random jury of token holders. Any token holder with enough tokens can stake their tokens to be considered for jury selection. When the dispute oracle is called upon, a predetermined number of jury members are selected. Each of them receive the shipment conditions, the shipment data points, and the Merkle tree needed to verify the data points. Each jury member reports the correct payment according to this data. If any jury member reports a payment different than the majority, they lose a portion or all of their staked tokens. Depending on which party reported the correct payment, the receiver or shipper's deposit will be returned and the other deposit will be distributed to jury members.

In one embodiment, if there is no majority decision from the jury, a new jury is selected and the process is started over. If the jury reports a payment amount that neither the receiver or the shipper reported, one of the deposits is distributed to jury members and one of the deposits is burned.

Figure 14:
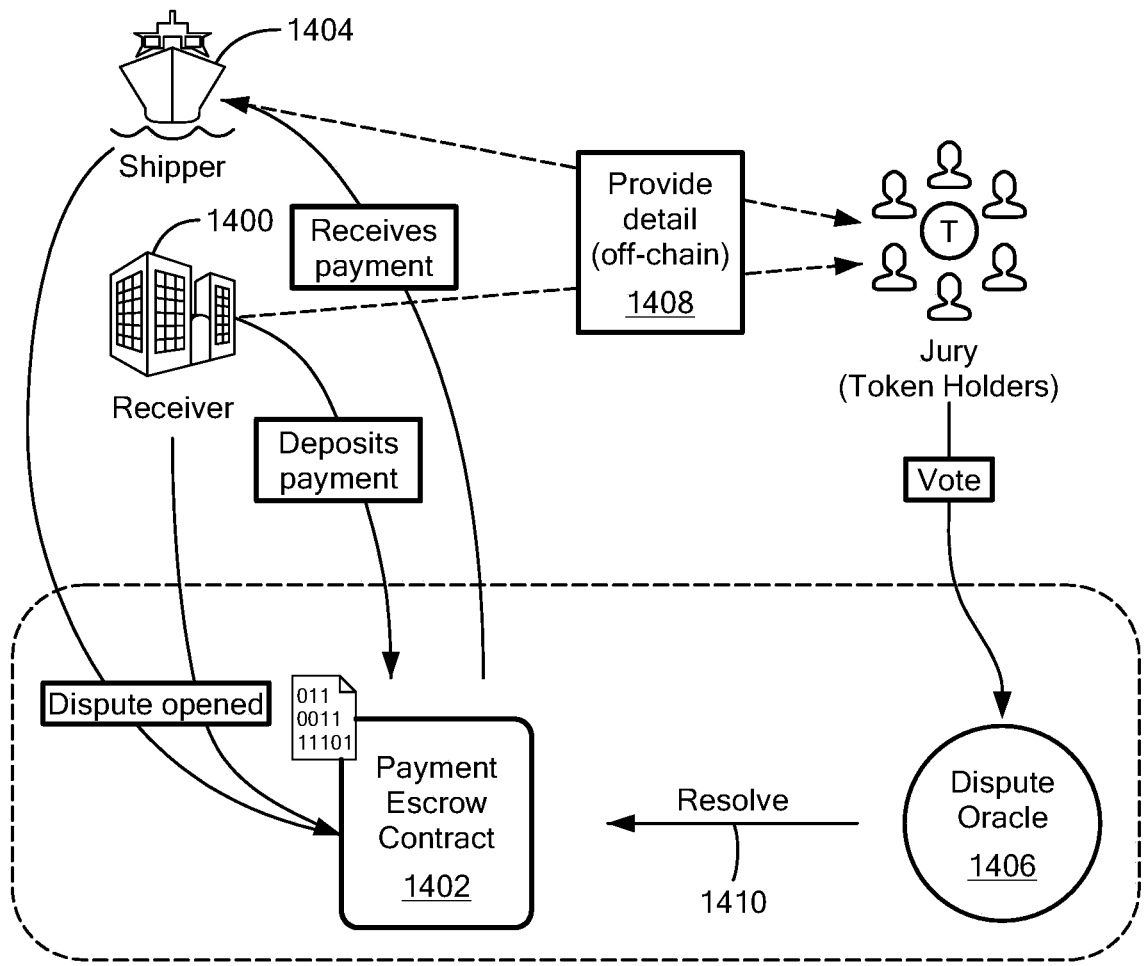
FIG. 14 is a representation of an example dispute resolution in a tracker data validation system.

FIG. 14 shows an example implementation of automated shipment settlements. Prior to shipment, a receiver 1400 funds an escrow contract 1402. Once the receiver 1400 has received the shipment, if there is no dispute initiated within some period of time, the shipper 1404 can receive payment in accordance with the terms of the escrow contact 1402.

If a dispute is initiated, such as by the receiver 1400 or other interested party, the shipper and receiver resolve the dispute in accordance with the escrow contract 1402. In an example embodiment, a dispute oracle 1406 is called upon to resolve the dispute. In one embodiment, a number of token holders form a jury to resolve the dispute. The jury can receive the details 1408 associated with the shipment, such as the Merkle information as described above, and vote. The dispute oracle 1406 receives the votes of the jury to resolve 1410 the dispute and fulfil the escrow contract 1402.

In one example, unresolved data points are resolved at shipment completion. When a shipment is complete, all the data points are placed in a Merkle Tree. Another example, could be done at every hour, 2-hours, day, etc.

Clients can resolve unresolved data points at various times. This can be predetermined by their requirements with the service provider (e.g., TIVE) and should be determined prior to the device going on the shipment.

In some embodiments, distributors may also receive tracker data, e.g., TIVE tracker data, and be allowed to resolve tracker data as well. A distributor may see the validity of the data points. This may be offered as a paid service for each resolution. In this arrangement, validity may come up when there are disputes between shipper, carrier, distributor, retailer, and trying to find out where the shipment failed.

Figure 15:
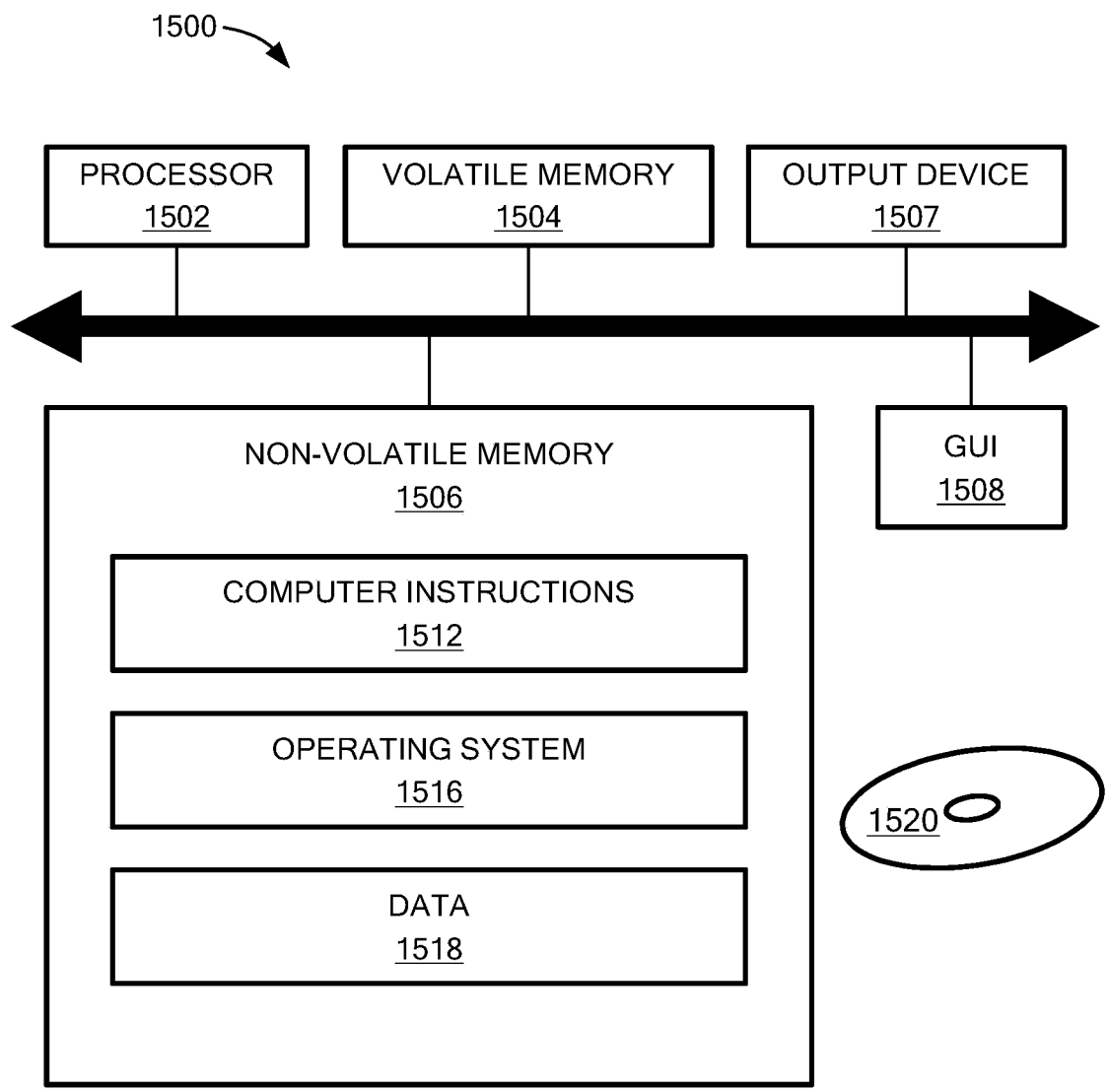
FIG. 15 is a block diagram of an example computer that can perform at least a portion of the processing described herein.

FIG. 15 shows an exemplary computer 1500 that can perform at least part of the processing described herein. The computer 1500 includes a processor 1502, a volatile memory 1504, a non-volatile memory 1506 (e.g., hard disk), an output device 1507 and a graphical user interface (GUI) 1508 (e.g., a mouse, a keyboard, a display, for example). The non-volatile memory 1506 stores computer instructions 1512, an operating system 1516 and data 1518. In one example, the computer instructions 1512 are executed by the processor 1502 out of volatile memory 1504. In one embodiment, an article 1520 comprises non-transitory computer-readable instructions.

Processing may be implemented in hardware, software, or a combination of the two. Processing may be implemented in computer programs executed on programmable computers/machines that each includes a processor, a storage medium or other article of manufacture that is readable by the processor (including volatile and non-volatile memory and/or storage elements), at least one input device, and one or more output devices. Program code may be applied to data entered using an input device to perform processing and to generate output information.

The system can perform processing, at least in part, via a computer program product, (e.g., in a machine-readable storage device), for execution by, or to control the operation of, data processing apparatus (e.g., a programmable processor, a computer, or multiple computers). Each such program may be implemented in a high level procedural or object-oriented programming language to communicate with a computer system. However, the programs may be implemented in assembly or machine language. The language may be a compiled or an interpreted language and it may be deployed in any form, including as a stand-alone program or as a module, component, subroutine, or other unit suitable for use in a computing environment. A computer program may be deployed to be executed on one computer or on multiple computers at one site or distributed across multiple sites and interconnected by a communication network. A computer program may be stored on a storage medium or device (e.g., CD-ROM, hard disk, or magnetic diskette) that is readable by a general or special purpose programmable computer for configuring and operating the computer when the storage medium or device is read by the computer. Processing may also be implemented as a machine-readable storage medium, configured with a computer program, where upon execution, instructions in the computer program cause the computer to operate.

Processing may be performed by one or more programmable processors executing one or more computer programs to perform the functions of the system. All or part of the system may be implemented as, special purpose logic circuitry (e.g., an FPGA (field programmable gate array) and/or an ASIC (application-specific integrated circuit)).

Having described exemplary embodiments of the invention, it will now become apparent to one of ordinary skill in the art that other embodiments incorporating their concepts may also be used. The embodiments contained herein should not be limited to disclosed embodiments but rather should be limited only by the spirit and scope of the appended claims. All publications and references cited herein are expressly incorporated herein by reference in their entirety.

What is claimed is:

1. A method, comprising:
registering a tracker device with a device registry, the device registry including a first smart contract, wherein registering the tracker device includes signing an identifier corresponding to a user with a private encryption key of the tracker device and resolving the signed identifier to the first smart contract;
collecting raw and signed data from the tracker device;
verifying the tracker device via the device registry;
generating data hashes from the collected data for storage; and
sending a root hash to root storage to enable validation of the tracker device, the root hash being generated from the collected data, the root storage including, at least in part, a second smart contract that is arranged to store root hashes that are generated by the tracker device.

2. The method according to claim 1, further including sending the raw and signed data to a network associated with the user to enable the validation of the raw and signed data.

3. The method according to claim 1, wherein the tracker device includes sensors to sense parameters.

4. The method according to claim 3, wherein the sensors sense the parameters at selected time intervals.

5. The method according to claim 1, wherein the data hashes are stored as part of a Merkle tree.

6. The method according to claim 5, wherein the root hash comprises a Merkle Root derived from the data hashes.

7. The method according to claim 1, wherein the validation comprises confirming that a Merkle root exists in storage and providing a proof that the Merkle root is derived from a Merkle tree in storage.

8. The method according to claim 1, wherein the validation comprises verifying data point signatures of the tracker device via the device registry.

9. The method according to claim 1, further including providing automated dispute resolution between shippers and receivers using the data from the tracker devices.

10. The method according to claim 1, wherein the data hashes are generated at the end of a shipment.

11. The method according to claim 1, wherein the data hashes are generated at predetermined time stamps.

12. The method according to claim 1, wherein the data hashes are generated corresponding to a selected number of data points.

13. The method according to claim 12, wherein the selected number of data points corresponds to a number of data points from the tracker device.

14. A system, comprising:
a memory; and
at least one processor operatively coupled to the memory, the at least one processor being configured to:
communicate with a device registry to register a tracker device with the device registry, the device registry including a first smart contract, wherein registering the tracker device includes signing an identifier corresponding to a user with a private encryption key of the tracker device and resolving the signed identifier to the first smart contract;
collect raw and signed data from the tracker device;
verify the tracker device via the device registry;
generate data hashes from the collected data for storage; and
send a root hash to root storage to enable validation of the tracker device, the root hash being generated from the collected data, the root storage including, at least in part, a second smart contract that is arranged to store root hashes that are generated by the tracker device.

15. The system according to claim 14, wherein the at least one processor is further configured to send the raw and signed data to a network associated with the user to enable the validation of the raw and signed data.

16. The system according to claim 14, wherein the tracker device includes sensors to sense parameters at selected time intervals.

17. The system according to claim 14, wherein the data hashes are stored as part of a Merkle tree derived from the data hashes.

18. The system according to claim 14, wherein the validation comprises confirming that a Merkle root exists in storage and providing a proof that the Merkle root is derived from a Merkle tree in storage.

19. The system according to claim 14, wherein the validation comprises verifying data point signatures of the tracker device via the device registry.

20. The system according to claim 14, further including an automated dispute resolution between shippers and receivers using the data from the tracker devices.

21. The system according to claim 14, wherein the data hashes are generated at the end of a shipment.

22. The system according to claim 14, wherein the data hashes are generated at predetermined time stamps.

* * * * *